Figure 1:
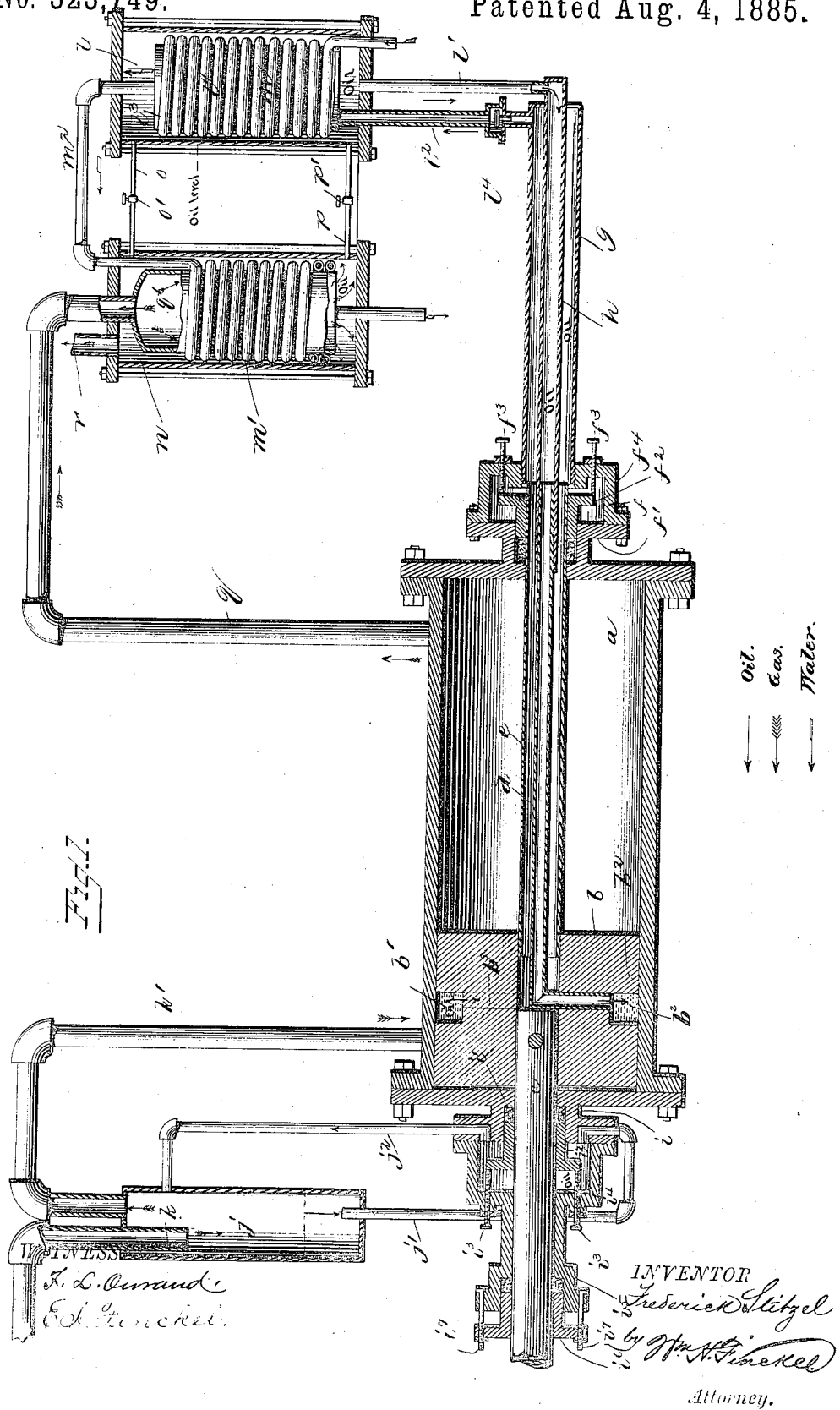

(No Model.) 2 Sheets—Sheet 1.

F. STITZEL.
COMPRESSOR FOR ICE MACHINES.

No. 323,749. Patented Aug. 4, 1885.

WITNESSES
INVENTOR
Frederick Stitzel
by Wm. H. Finckel
Attorney.

(No Model.)  2 Sheets—Sheet 2.
F. STITZEL.
COMPRESSOR FOR ICE MACHINES.
No. 323,749.  Patented Aug. 4, 1885.
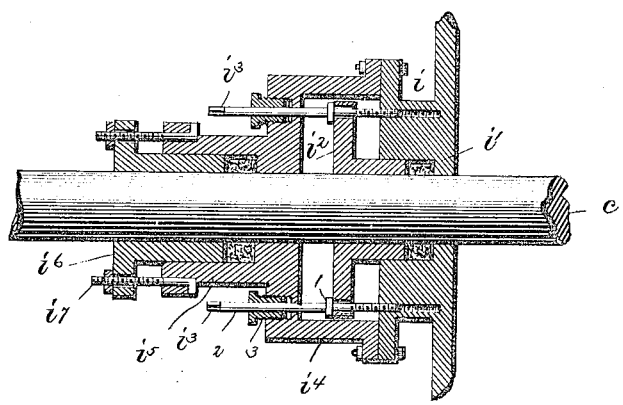
Fig. 2.
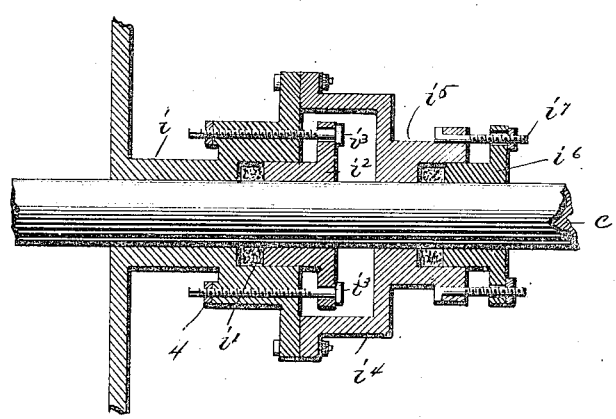
Fig. 3.
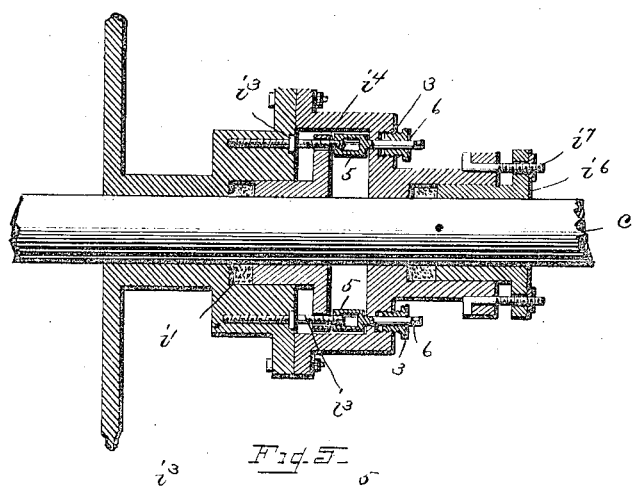
Fig. 4.
Fig. 5.
WITNESSES
L. L. Ouvand.
E. A. Finckel.
INVENTOR
Frederick Stitzel
by Wm. H. Finckel
Attorney.

UNITED STATES PATENT OFFICE.

FREDERICK STITZEL, OF LOUISVILLE, KENTUCKY, ASSIGNOR OF TWO-THIRDS TO ADOLPH REUTLINGER AND MOSES SCHWARTZ, BOTH OF SAME PLACE.

COMPRESSOR FOR ICE-MACHINES.

SPECIFICATION forming part of Letters Patent No. 323,749, dated August 4, 1885.

Application filed November 3, 1884. (No model.)

*To all whom it may concern:*

Be it known that I, FREDERICK STITZEL, a citizen of the United States, residing at Louisville, in the county of Jefferson and State of Kentucky, have invented certain new and useful Improvements in Compressors for Ice-Machinery, of which the following is a full, clear, and exact description.

The object of this invention is to increase the efficiency of gas-compressors, more especially of those used for liquefying the gases used in the artificial production of ice. In such compressors, more particularly those employed in connection with the ammonia process, it has heretofore been found difficult to prevent the leakage between the piston and walls of the cylinder without packing the piston so tight as to cause great friction. Another serious difficulty has been experienced in connection with leakage of gas from the cylinder into the oil-chamber of the stuffing-box, and thence into the circulation. Now, while the gas so escaping is not lost, yet the power expended in compressing it is, and the evil is just as great. This leakage has been tolerated rather than sustain the loss of time and amount of labor necessary to remove the oil-chamber to gain access to the gland and packing. Furthermore, difficulty has heretofore been experienced in separating from the gas the oil used in lubricating the apparatus.

Now, my invention consists in means for meeting these several objections, substantially as hereinafter set forth and claimed.

In the accompanying drawings, illustrating my invention, in the several figures of which like parts are similarly designated, Figure 1 is a vertical section; Figs. 2, 3, and 4, vertical sections of various forms of stuffing-boxes employed in connection with my apparatus, and Fig. 5 a sectional detail of Fig. 4.

In practicing my invention I make use of a pump-cylinder, $a$, having a piston, $b$, which is driven by a suitably-operated piston-rod, $c$. This piston has an annular circumferential groove, $b'$, in communication by duct $b^2$ with a pipe, $d$, and by a duct, $b^3$, with a pipe, $e$, the latter pipe encircling the former. The pipe $e$ is packed gas-tight in a stuffing-box, $f$, on one head of the cylinder. This box is composed of a chambered boss, $f'$, on the cylinder-head, containing packing material of suitable sort, held in place by a gland, $f^2$, seated thereon, by set-screws $f^3$, tapped in the bonnet $f^4$, which latter is bolted to the boss. By means of the set-screws projecting outside of the bonnet, the packing can be tightened up at pleasure without stopping the machine or removing any parts. In the head of the bonnet is screwed or otherwise affixed a tube, $g$, of enough greater diameter to receive the pipe $e$, and within tube $g$ is centered a second tube, $h$, within which the pipe $d$ fits, and the fitting of these several tubes is tight. As the piston reciprocates the pipes $d$ $e$ move with it and enter the tubes $h$ $g$, respectively, thus constituting a secondary pump, which, as will presently appear, is the mechanism whereby, in connection with the pressure of the gas, a forced circulation of oil is had to insure the prevention of leakage of gas between the cylinder and piston, and to effect the constant lubrication of the pump.

The piston-rod $c$ passes through a gas-tight stuffing-box constructed as follows: The head of the cylinder is provided with a boss, $i$, chambered to receive packing $i'$, and a superposed gland, $i^2$, which is adjustably seated on the packing by set-screws $i^3$, secured in the bonnet $i^4$, which last is affixed to the boss $i$, as by bolts, and said bonnet is extended into a chambered and packed boss, $i^5$, having a gland, $i^6$, which gland is adjustable in said boss to tighten the packing by means of bolts $i^7$, substantially as shown. The stuffing-box is thus double to insure against leakage, and it will be noticed that its mechanism for tightening up the packing is readily accessible outside of the box, so that when the glands require adjustment no part of the box has to be removed, nor has the machine to be stopped. Other forms of this box are shown in Figs. 2, 3, and 4, in all of which the outer gland and boss are the same as in Fig. 1; but in Fig. 2 the screws $i^3$ are tapped in the boss $i$, passing loosely through holes in the flange of the gland and engaging the gland by collars 1, and extended thence as shanks 2 through glands 3, tapped in the bonnet $i^4$, these latter glands being packed to make tight joints. The adjustment of the gland $i^2$ in this instance is effected by a wrench applied to the stems 2 of the screws. In Fig. 3 the screws $i^3$ are passed through holes in the gland's flange, and their heads abut against the outer face of said flange, the screws extending through screw-threaded holes in the boss, and being secured outside by jam-nuts 4. In this instance the gland is adjusted by a wrench applied to the screws, which are constructed with this end in view. In Fig. 4 the screws are firmly and immovably embedded in any suitable manner in the boss and pass loose through holes in the flange of the gland, and on the outer side of the gland they are engaged by nuts 5, the stems 6 of which are square to receive a wrench, and pass through packed glands 3, tapped in the bonnet. By rotating the nuts 5 in one direction they are advanced on the screws $i^3$ and, bearing against the flange of the gland, force and hold said gland down against the packing.

Other forms of stuffing-boxes applicable in this connection may be seen in my application for Letters Patent therefor of even date of filing.

The stuffing-box is lubricated by means of a circulating medium—say oil—through a low-pressure trap, $j$, which is the reservoir for the lubricant. This trap has an outlet or supply pipe, $j'$, opening into the lower portion of the stuffing-box through its stationary bottom or the boss, and a return-pipe, $j^2$, leading from the upper portion of a fixed portion of the box back to the trap, and the oil is circulated by pressure of the free gas let into the trap before it is introduced into the pump for compression, $k$ being the gas-inlet into the reservoir, its end extending into the reservoir below the return-pipe $j^2$, and $k'$ being the gas-outlet from the trap into the pump, it taking the gas from the top of the trap. By connecting the stuffing-box with the trap through the base, the bonnet of the box is readily removable to admit access to the interior of the box for cleaning, repacking, &c., without disconnecting the circulating-pipes. In the forms of stuffing-boxes shown in Figs. 2, 3, and 4 the circulating-connections with the trap are not shown; but they are obvious, and may be made anywhere in the base, so as not to obstruct the bonnet or the gland-adjusting devices.

In connection with the pump I employ a tank, $l$, to receive oil or other equivalent fluid, and this tank communicates from its bottom by a pipe, $l'$, with the stationary tube $h$, whereby the fluid is supplied to the annular chamber $b^2$ in the piston $b$ through said tube $h$ and the pipe $d$. The return of the oil from said chamber is through the duct $b^3$, pipe $e$, tube $g$, and pipe $l^2$ into a basin, $l^3$, within the tank $l$. Backflow from the basin or tank through the pipe $l^2$ is prevented by a check-valve, $l^4$, in said pipe. The returned oil will be more or less heated by its passage through the pump, and as this is undesirable I cool it while in the basin and tank by a cooling agent, as water, circulating through a coil of pipe, $m$, encircling the basin within the tank. A second tank, $n$, is employed, which is connected, top and bottom, with tank $l$ by pipes $o$ $p$, having cocks $o'$ $p'$, respectively. This tank $n$ is connected by gas-pipe $q$ with the exit end of the pump, said pipe opening into said tank through a bell, $q'$, which extends nearly to the bottom of said tank, and is surrounded by a coil of pipe, $m'$, which is connected by pipe $m^2$ with the coil $m$ of tank $l$. The incoming gas carries with it some oil, which is separated from it by contact with the cool coil after it has passed out of the bell into the tank. This bell and its coil may therefore be termed a "separator." The bell has the additional function of forcing the gas to the coil. The gas escapes from the tank $n$, and is conducted thence through pipe $r$ to the usual condenser, thence to the liquid-holder, next to pipes, where it expands to produce its congealing effect, and then back again through the trap to the pump, to be recompressed and used over again. In running the apparatus the valve $o'$ is partly open and the valve $p'$ closed, and when oil has accumulated in the tank $n$ the upper valve is closed and the lower opened till all the oil in the tank $n$ is forced by the gas-pressure in the said tank into the tank $l$, when the valves are set as before and the tank $l$ again subjected to the pressure of the pump to cause a forced circulation of the oil. Now this forced circulation of the oil insures a perfectly (or nearly so) gas-tight piston, and almost, if not entirely, precludes the leakage of the gas past the piston, at the same time keeping the pump perfectly lubricated and without undue friction.

A circulation of cooling agent is kept up through the coils $m$ $m'$.

It is obvious that it is next to impossible for the gas to leak into the stuffing-box, and as the lubricant in said box is kept in circulation it will be kept cool, and heating of the box thus prevented. The cooling of this lubricating material is insured by the constant passing of the gas returned therethrough for recompression, for such gas retains its cold in a large measure after usage for congelation.

Care will be taken to preserve the parallelism of the glands with the piston-rod in making their adjustments by means of the set-screws and screw-hooks. The set-screws are made tight with the bonnet by jam-nuts or equivalent means, and even by the addition of packing, if necessary, as it is of the first importance that the apparatus be made gas-tight. I have shown only the jam-nuts. These jam-nuts, as shown throughout the drawings, subserve not only this purpose, but also that of retaining the screws against accidental displacement and working loose.

What I claim is—

1. The combination of a pump-cylinder, its piston having an oil-chamber in its rim, and an oil-circulating mechanism, substantially as shown and described.

2. The combination, with the pump-cylinder, its piston having an oil-chamber in its rim, and induct and educt therefor, of the secondary pump connected with said oil-chamber, an oil-reservoir therefor, stuffing-boxes for the pumps, an oil-holder, and connecting circulating-pipes, substantially as shown and described.

3. The combination, with a gas-pump and mechanism, substantially as described, for circulating lubricant through the same, of the gas-receiving tank provided with a bell, and surrounding coil of cooling-pipe constituting a separator for dissociating the mingled oil and gas as they come from the pump, substantially as set forth.

4. The combination of the lubricant-tank, the pump, and its chambered piston with the tube $h$ and pipe $d$, the tube $g$ and pipe $e$, the valved pipe $l^2$, and the gas-tank, substantially as described.

5. The combination, with a pump, of a stuffing-box having its packing compressible by means of a gland, and set-screws connected with said gland to move it, and projecting out of the bonnet for adjusting such gland exteriorly of the pump, substantially as described.

6. The combination, with a pump, of a double stuffing-box having its packing compressible by means of inner and outer glands, and set-screws connected with said glands and projecting outside for adjusting the glands exteriorly of the surrounding chamber, substantially as described.

In testimony whereof I have hereunto set my hand this 30th day of October, A. D. 1884.

FREDERICK STITZEL.

Witnesses:
  ALBERT REUTLINGER,
  CHAS. PHIL. MILLER.